United States Patent [19]

Lasseter

[11] 4,340,921
[45] Jul. 20, 1982

[54] HVDC POWER TRANSMISSION SYSTEM WITH METALLIC RETURN CONDUCTOR

[75] Inventor: Robert H. Lasseter, Swarthmore, Pa.

[73] Assignee: General Electric Company, Philadelphia, Pa.

[21] Appl. No.: 198,340

[22] Filed: Oct. 20, 1980

Related U.S. Application Data

[63] Continuation of Ser. No. 908,331, May 17, 1978, abandoned.

[51] Int. Cl.³ .............................................. H02H 7/10
[52] U.S. Cl. ...................................... 361/56; 361/62; 361/91; 361/111; 361/127; 363/51
[58] Field of Search .................. 361/91, 127, 56, 110, 361/111, 117, 42, 47, 48–50, 118, 62; 363/50–55, 34–37, 40, 75; 307/20, 51

[56] References Cited

U.S. PATENT DOCUMENTS

| | | | |
|---|---|---|---|
| 3,531,710 | 9/1970 | Breuer et al. | 363/51 |
| 3,805,114 | 4/1974 | Matsuoka et al. | 361/128 |
| 3,832,620 | 8/1974 | Pollard | 363/35 |
| 3,857,070 | 12/1974 | Smith | 363/37 X |
| 3,928,245 | 12/1975 | Fishman et al. | |
| 3,959,543 | 5/1976 | Ellis | 428/66 |

OTHER PUBLICATIONS

"A New Concept in Station Arrester Design", by Sakshaug et al., I.E.E.E. Transactions on Power Apparatus and Systems, vol. PAS-96, No. 2, Mar./Apr. 1977, pp. 647–656.

"Monopolar Metallic Return Operation of Long Distance H.V.D.C. Transmission Systems", by Hingorani, I.E.E.E. Transactions on Power and Systems, pp. 554–563, 1971.

Primary Examiner—Patrick R. Salce
Attorney, Agent, or Firm—William Freedman

[57] ABSTRACT

A high voltage d.c. power transmission system utilizes a metallic return conductor for carrying return current between converters at opposite ends of the system. The return conductor is connected to earth ground at one end of the system and is otherwise insulated from earth ground so that its opposite end is floating with respect to d.c. The return conductor has no capacitor connected from earth ground thereto of a size capable of limiting the voltage thereon. But connected between said opposite end of the return conductor and earth ground is a valve-type surge arrestor having a primarily zinc-oxide valve element and no gap in series therewith. This surge arrestor has a protective level that is reached by the overvoltages produced by the normal operating transients of the system, such as those produced by system start-up and commutation failures.

6 Claims, 4 Drawing Figures

Fig. 1A. VOLTAGE AT FLOATING END OF RETURN CONDUCTOR

HVDC POWER TRANSMISSION SYSTEM WITH METALLIC RETURN CONDUCTOR

This is a continuation of application Ser. No. 908,331, filed May 17, 1978, and now abandoned.

BACKGROUND

This invention relates to a high voltage d.c. power transmission system that utilizes a metallic conductor as a return, or neutral, conductor for carrying return current between opposite ends of the system. More particularly, the invention relates to means for protecting the return conductor and associated equipment against overvoltages produced by system transients.

An HVDC system is sometimes called upon to operate in a monopolar metallic return mode. This is a monopolar mode in which the d.c. current returns through a separate metal conductor instead of through the earth or ground, sometimes referred to hereinafter as earth ground. In such a system, one end of the return conductor is grounded while the other end floats with respect to d.c. The floating end is often very remote from the grounded end. For example, in one HVDC system presently in operation, i.e., the Square Butte system operating between Center, N.D. and Arrowhead, Minn., the distance between the two ends is 465 miles.

Under steady-state conditions, the neutral voltage at the floating end of the return conductor is equal to the d.c. "IR" drop of the return conductor. In the Square Butte system referred to above, this steady-state voltage is about $-16$ kV, assuming converter 12 of FIG. 1 has the polarity depicted therein.

The voltage level of the neutral under steady-state conditions pesents few insulation problems. But large overvoltages can occur on the return conductor during transients, such as converter bypass, commutation failures, starts, restarts, a.c. voltage transients, and d.c. line faults. All these conditions cause overvoltages to be superimposed on the steady-state voltage.

Such overvoltages require either that the insulation level of the neutral, at its floating end, be very high or that some means be provided to hold down the level to which the overvoltage rises. In a technical paper appearing in the IEEE Transactions on Power Apparatus and Systems, 1971, pages 554–563, N. R. Hingorani describes an arrangement for implementing the latter approach.

More specifically, Hingorani connects between the neutral conductor and ground, at the floating end of the neutral conductor, the parallel combination of a large capacitor and a gap-type lightning arrestor. There are several problems associated with this type of apparatus. First, the capacitor must be large enough so that the gap-type arrestor does not spark-over for most operating transients, and such a capacitor is quite expensive. In one existing system, this capacitor has a value of 50 µf. A second problem with this prior apparatus is that harmonics generated by the converters tend to pass through the large capacitor and ground in preference to the metallic return conductor inasmuch as the capacitor and ground have a lower harmonic impedance than the metallic return. The resulting harmonic current through ground is a major cause of telephone interference.

SUMMARY

An object of my invention is to provide effective overvoltage protection for the neutral without requiring the large capacitor described hereinabove that has been connected between the return conductor and ground at the floating end of the return conductor, or neutral.

Another object is to provide neutral overvoltage protective apparatus which effectively limits the harmonic currents flowing through ground and producing telephone interference.

Another object is to provide neutral overvoltage protective means which is capable of increasing the effectiveness of the usual harmonic filters shunting the converters.

An additional disadvantage of the prior apparatus referred to hereinabove is that spark-over of the gap-type arrestor activates the d.c. line fault protection control, which sometimes brings the system current to zero to allow the gap current to come to zero in order to permit the gap to recover its dielectric strength. This has meant undesirable loss of the system for several hundred milliseconds. The previously-described large capacitor has been relied upon to reduce the frequency of such system losses since the capacitor has been used to limit the voltage on the neutral under most transient conditions to values below the spark-over voltage of the arrestor.

Accordingly, another object of my invention is to provide overvoltage protective means which, despite the absence of the large capacitor, can dissipate the energy of transient overvoltages under most transient operating conditions without necessitating the above-described interruptions in system current.

In carrying out the invention in one form, I provide a high voltage d.c. power transmission system comprising: (i) a high voltage line, (ii) a first converter at one end of the line having first and second d.c. terminals of opposite polarity, the first terminal being connected to said line, (iii) a second converter at the opposite end of said line having first and second d.c. terminals of opposite polarity, the first terminal of said second converter being connected to said line, and (i.v.) a metallic return conductor interconnecting said second d.c. terminals of the two converters. Means is provided for connecting said second terminal of said second converter to earth ground at said second terminal, and means is provided to insulate the metallic return conductor from earth ground except for this ground connection. The metallic return conductor has no capacitor connected from earth ground thereto of a size capable of effectively limiting the voltage thereon. Connected between the second terminal of the first converter and earth ground, I provide a valve-type surge arrestor having a primarily zinc-oxide valve element and no gap in series therewith. The valve element is characterized by (i) substantial non-conductance of currents therethrough until the voltage thereacross reaches a predetermined protective level and (ii) an ability to return to its substantially non-conducting state when the voltage thereacross drops to a seal-off level close to said protective level.

The surge arrestor has a protective level that is reached by the overvoltages produced on said return conductor by normal operating transients of the system, such as those overvoltages produced by system start-up and by commutation failures.

BRIEF DESCRIPTION OF DRAWINGS

For a better understanding of the invention, reference may be had to the following description taken in conjunction with the accompanying drawings, wherein:

FIG. 1a is a graph showing certain voltage relationships present in the system of FIG. 1 at the floating end of its return conductor.

DETAILED DESCRIPTION OF PREFERRED EMBODIMENT

Figure 1:
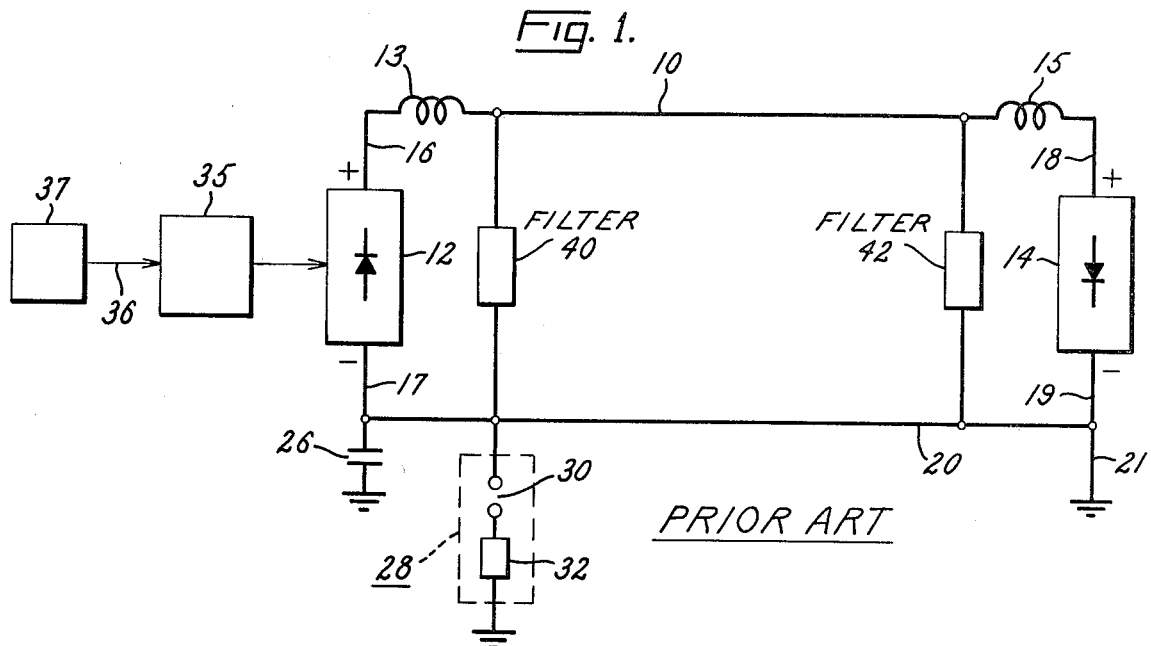
FIG. 1 is a schematic showing of a prior art HVDC system such as referred to hereinabove.

Referring now to FIG. 1, the prior art HVDC power transmission system schematically shown therein comprises a high voltage transmission line 10, which may be either an overhead or underground line, and two converters 12 and 14 at opposite ends of the line. Converter 12 usually functions as a rectifier and converter 14 as an inverter, but the role of either converter can be reversed in a conventional manner as occasion demands. The two converters may be separated by great distances, e.g., the 465 miles present in the above-referred-to Square Butte system.

The converters can be of any conventional form, such as, for example, the form depicted in U.S. Pat. No. 3,832,620 to Pollard, where the converter comprises a plurality of controllable valves connected in a three-phase, double-way, 6 pulse bridge configuration. The converters 12 and 14 are provided with the usual controls, an example of which is shown and claimed in aforesaid Pollard patent, for controlling the firing angles of the valves. In FIG. 1, I have schematically shown at 35 such a control for converter 12. It is conventional to provide such a control with pole protection means, schematically shown at 37, for detecting the presence of a d.c. line fault and for developing an output signal which is supplied via circuit 36 to control 35 upon the occurrence of a d.c. line fault. The control 35 upon receiving this signal via circuit 36 in response to a d.c. line fault, drives the rectifier into inversion, thus forcing the system current to zero. After a brief period, such as 200 to 500 msecs, which is normally sufficient to permit deionization of an arcing fault, control 35 restores the system to normal.

In certain systems, instead of driving the system current immediately to zero in response to a d.c. line fault, as described above, the system current is ramped down to a minimum level in such a manner as to cause reversal of the current in the fault. If the fault current thereafter persists, the system current is reduced to zero through appropriate valve control.

Each converter 12 and 14 has two spaced-apart d.c. terminals of opposite polarity. The upper terminal 16 of converter 12, the rectifier, is connected to one end of transmission line 10 through a smoothing reactor 13; and the upper terminal 18 of converter 14, the inverter, is connected to the opposite end of the power line through a smoothing reactor 15. The lower terminal 19 of the inverter is electrically connected to the lower terminal 17 of the rectifier through a metallic return conductor 20, sometimes referred to as the neutral, or neutral conductor.

The end of the return conductor 20 at the inverter end of the system is connected to earth ground through a ground connection 21. The opposite end of the return conductor 20 may be thought of as floating with respect to d.c. Under steady state conditions, the voltage between the return conductor 20 and earth ground at the floating end is equal to the "IR" drop resulting from return current through conductor 20. In the 465 mile Square Butte System, referred to above, this steady-state neutral-to-ground voltage is about −16 kV, as indicated at A in the graph of FIG. 1a.

As pointed out in the introduction, this neutral d.c. level presents few insulation problems. But large overvoltages can occur on the neutral during transients, such as those mentioned in the introduction. Such transient conditions cause overvoltages that are superimposed on the steady state voltage as indicated at B in FIG. 1a.

This can be better appreciated if one assumes that the system of FIG. 1 is operating with −16 kV present at the floating end of the neutral 20, and then suddenly the inverter 14 is bypassed. The normal voltage at the upper terminal 18 of the inverter, which will be assumed to be +218 kV, suddenly collapses to zero. This produces a voltage transient that propogates down the return conductor 20 toward its floating end, driving this end to a much higher negative voltage.

Such an overvoltage would require either that the insulation level of the neutral and its associate equipment be as high as on the high side of the converters or that some means be provided for holding down the overvoltage. In prior systems, such as described in the Hingorani paper referred to hereinabove, there is provided a voltage-limiting arrangement that comprises a large capacitor and a gap-type lightning arrestor connected in parallel with each other between the floating end of the neutral conductor and ground. FIG. 1 shows such a capacitor at 26 and such a gap-type arrestor at 28. The gap-type arrestor is a conventional device comprising a gap device 30 and, in at least one prior system, also comprising a valve element 32 of silicon carbide connected in series with the gap device 30.

This type of arrangement has several disadvantages. First, the capacitor 26 must be large enough so that the gap-type arrestor 28 does not spark-over for most operating transients, and such a capacitor is quite expensive. It is important to prevent such spark-overs of the gap-type arrestor because when such arrestor sparks over, it appears as a d.c. line-to-ground fault and activates the pole protection means 37 if the arrestor current persists. This may cause a loss of the d.c. system for several hundred milliseconds, which is undesirable, following which a restart is required.

A second disadvantage of the arrangement of FIG. 1 is that harmonics generated by the converters tend to pass through the large capacitor and earth ground in preference to the parallel path through the metallic return conductor inasmuch as the capacitor and earth ground have a lower harmonic impedance than the metallic return. The resultant current through earth ground is a major cause of telephone interference.

Another disadvantage of the arrangement of FIG. 1 is that the presence of the large capacitor detracts from the effectiveness of the usual harmonic filters 40 and 42 shunting the respective converters. For a better understanding of this latter point, reference may be had to FIG. 2 where the harmonic filter 42 shunting the inverter 14 is shown. The impedance of the path, through earth ground and the large capacitor is schematically depicted as $Z_g$. The harmonic current generated by the inverter 14 is designated $I_h$. If this current can be forced through the harmonic filter 42 instead of out onto the line, noise will be significantly reduced. Most of the current $I_h$ will flow through the filter at frequencies where the filter impedance $Z_f$ is less than the effective total impedance of the return line 20 and the earth ground impedance $Z_g$. In the case of a large grounding capacitor 26, $Z_g$ is less than $Z_f$ at all frequencies except where the filter is tuned, thus allowing a major portion of the current $I_h$ at such frequencies to bypass the filter and flow out onto the line. This, of course, detracts from the effectiveness of the filter.

Figure 3:
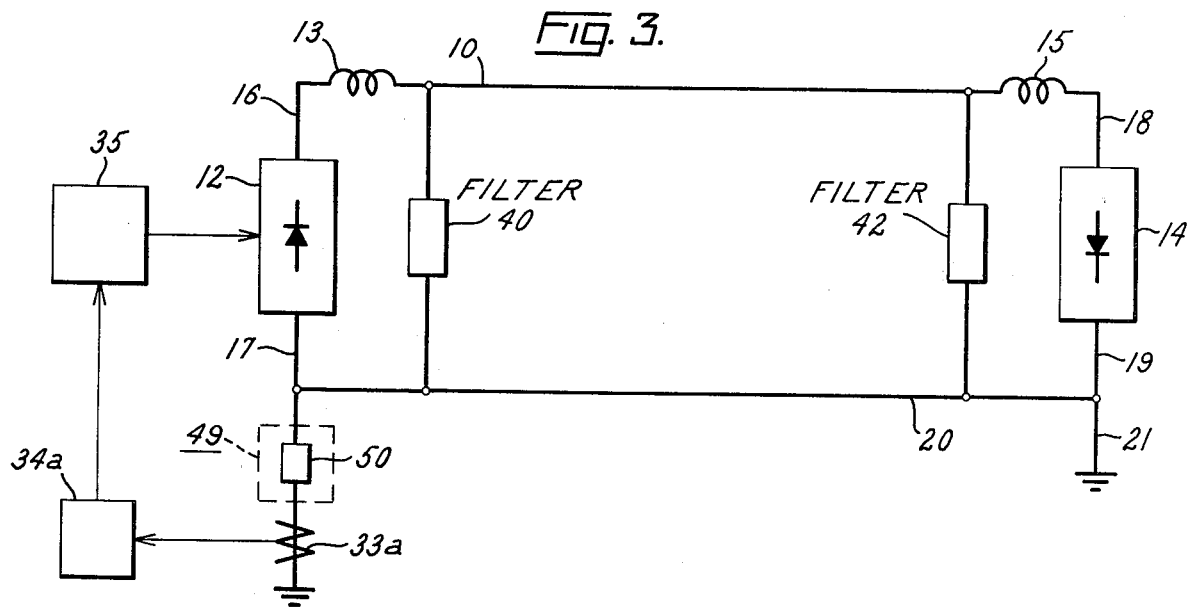
FIG. 3 is a schematic showing of an HVDC system embodying one form of my invention.

I am able to largely overcome these disadvantages by using at the floating end of the metallic return conductor 20 a different type of overvoltage protective means from that shown in FIG. 1. Referring to FIG. 3, this overvoltage protective means comprises an arrestor 49 comprising a valve element 50 and no gap in series with the valve element. The valve element 50 is not of the usual silicon carbide material typically used in arrestors but rather is of a ceramic material, sintered at high temperature, and consisting essentially of zinc-oxide and a small amount of other metal-oxide additives that produce the desired non-linear characteristics of the valve element. The basic structure of the sintered material is a matrix of highly conductive zinc oxide grains, joined by highly resistive intergranular layers consisting primarily of the metal oxide additives. Under sufficient electrical stress, the intergranular layers start to conduct in a highly non-linear mode. Examples of this type of ceramic material are disclosed and claimed in U.S. Pat. No. 3,928,245 to Fishman et al assigned to the assignee of the present invention. This type of arrestor is discussed in a technical paper by Sakshaug et al entitled "A New Concept in Station Arrester Design" appearing in the IEEE Transactions on Power Apparatus and Systems, Vol. PAS-96, No. 2 pages 647–656, March/April, 1977.

As pointed out in the paper by Sakshaug et al, this arrestor draws very little current until a voltage approaching its protective level is reached, and then only that current is drawn which is necessary to limit the overvoltage to the protective level. Furthermore, the arrestor returns to its original state of substantially no-conduction when the voltage applied thereto drops to a voltage level very near the same voltage level at which conduction started. Stated another way, this arrestor has an exceptionally high degree of non-linearity in its voltage-current characteristic. Moreover, the protective characteristics of this valve material remain essentially unchanged despite exposure of the valve material to the repetitive passage therethrough of discharge currents, even relatively high discharge currents.

Another important point to note with respect to the arrangement of FIG. 3 is that there is no capacitor corresponding to the capacitor 26 of FIG. 1 connected between the return conductor and earth ground. Stated another way, in the arrangement of FIG. 3, there is no capacitor connected between the return conductor 20 and earth ground of a size capable of limiting the voltage appearing on the return conductor. Since no such capacitor is present, the voltage on the return conductor 20 resulting from normal operating transients (such as start-up, commutation failure, inverter bypass and blocking) is permitted to rise without attenuation toward the protective level of the arrestor 49, 50. If this voltage reaches the protective level of the arrestor, the valve 50 of the arrestor becomes conducting, allowing sufficient current therethrough to clip the voltage. When the discharge voltage across the arrestor, i.e., the voltage produced by the transient current therethrough drops to a seal-off value slightly below the arrestor's protective level, the valve returns to its normally non-conducting state. There is no large follow current through the arrestor necessitating converter operations that could bring the system current to zero. Hence, for such normal operating transients, even though the arrestor may operate to pass substantial currents, it is unnecessary to lose the system for brief periods, as has often been the case when the gap device of prior systems has sparked-over.

Of course, with the capacitor no longer present, the heretofore-required substantial expense of providing such a capacitor is obviate.

In addition, with the capacitor no longer present, the impedance of the path through earth shunting the return conductor 20 is much higher than when the capacitor is present, thus greatly reducing the current through the earth, thus reducing the telephone interference that results from current through the earth.

Figure 2:
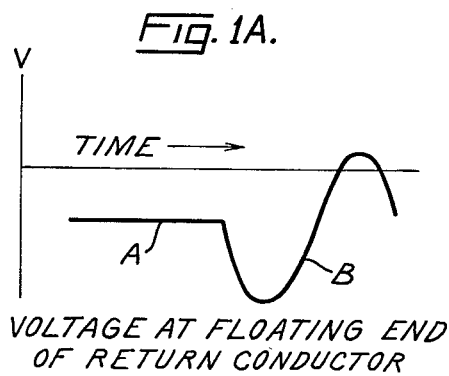
FIG. 2 is a diagrammatic showing illustrating the effect of ground impedance on the operation of a conventional harmonic filter shunting the inverter.
Figure 2:
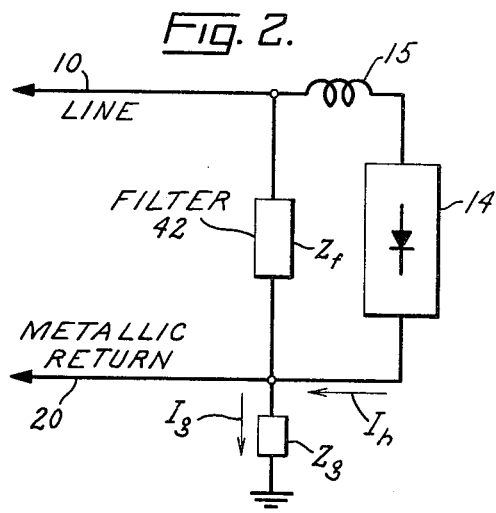

Still further, referring to FIG. 2, with the capacitor no longer present, $Z_g$ is much higher than when the capacitor is present. As a result, the absence of the capacitor in the system of FIG. 3 results in forcing most of the harmonic current $I_h$ through the harmonic filter 42, thereby increasing the effectiveness of the harmonic filter.

The valve member 50 is selected to have sufficient thermal capacity so that it can not only handle the normal transient conditions referred to above, but also can handle abnormal transient conditions such as d.c. line faults. A d.c. line fault from the high voltage line 10 to ground at the rectifier would impose the most severe duty on the arrestor 49, 50. In the aforesaid Square Butte system, this produces a peak current for several microseconds of many thousand amperes followed by a persistent current averaging about 300 to 400 amperes for 30–35 msecs. The arrestor's energy-handling capability is much greater even than needed for this duty.

A possible, but very unlikely, type of system failure is a break in the return conductor 20 while this system is operating at high current. This would force all the system current through the arrestor. To prevent the arrestor from being destroyed by such duty, sensing means 33a, 34a senses excessive current through the arrestor and if this current exceeds a threshold value for more than a predetermined minimum period, it develops a signal which is supplied to the control means 35. Control means 35 responds by driving the rectifier into inversion, thereby interrupting system current within a time short enough to prevent the arrestor from being damaged by this condition.

More details of an arrestor suitable for use in practicing this invention (as shown at 49, 50 of FIG. 3) can be found in U.S. Pat. No. 3,959,543-Ellis, assigned to the assignee of the present invention. This Ellis patent, as well as the Fishman et al patent referred to hereinabove, are incorporated by reference into the present application.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In a high voltage d.c. power transmission system comprising: (i) a high voltage line, (ii) a first converter at one end of said line having first and second d.c. terminals of opposite polarity, the first terminal being connected to said line, (iii) a second converter at the opposite end of said line having first and second d.c. terminals of opposite polarity, said first terminal of the second converter being connected to said line, and (iv) a metallic return conductor interconnecting said second d.c. terminals of the two converters, the combination of:

(a) means for connecting said second terminal of said second converter to earth ground at said second terminal,
   (b) means insulating said metallic return conductor from earth ground except for the earth ground connection defined hereinabove in (a), thereby causing said second terminal of said first converter to be floating with respect to d.c. under steadystate conditions so as to allow voltages of several thousand volts or more to be developed on said metallic return conductor at said second terminal of the first converter,
   (c) said metallic return conductor having no capacitor connected from earth ground thereto of a size capable of effectively limiting the voltage thereon during operating transients on the system, and
   (d) a valve-type surge arrestor connected between the second terminal of said first converter and earth ground, said surge arrestor having a primarily zinc-oxide valve element and no gap in series therewith, said valve element being characterized by (i) substantial non-conductance of currents therethrough until the voltage thereacross reaches a predetermined protective level, and (ii) an ability to return to its substantially non-conducting state when the voltage thereacross drops to a seal-off level close to said protective level,
   (e) said insulating means of (b) hereinabove and said surge arrestor of (d) hereinabove, during normal operation of said converters, providing, at all locations along said metallic return conductor except at the connection of (a) hereinabove, a high impedance to normal harmonic currents generated by operation of said converters and attempting to flow through said connection of (a), thereby effectively limiting the flow between said converters through earth ground of said normal harmonic currents,
   (f) the surge arrester having a protective level that is reached by the overvoltages produced on said return conductor by normal operating transients of the system.

2. The apparatus of claim 1 in which:
   (a) discharge currents flow through said valve element when the voltage thereacross reaches said predetermined protective level, and
   (b) said valve element is further characterized by an ability to maintain the discharge voltage developed thereacross during flow of said discharge currents at substantially said protective level except during very high discharge currents.

3. The apparatus of claim 1 in which said surge arrestor has a protective level that is reached by the overvoltages produced by the normal operating transients of system start-up.

4. The apparatus of claim 1, 2, or 3 in which said surge arrestor has a protective level that is reached by the overvoltages produced by the normal operating transients of commutation failures in a converter.

5. The apparatus of claim 1 in combination with means for interrupting the system current in the event that high current through said surge arrestor persists for a predetermined minimum period.

6. The apparatus of claims 1, 2, or 3 in combination with a harmonic filter connected in shunt with said second converter.

* * * * *